(12) United States Patent
Kim et al.

(10) Patent No.: US 9,461,318 B2
(45) Date of Patent: Oct. 4, 2016

(54) HUMIDIFIER FOR FUEL CELL AND FUEL CELL SYSTEM COMPRISING THE SAME

(71) Applicant: Hyundai Motor Company, Seoul (KR)

(72) Inventors: Hyunyoo Kim, Seoul (KR); Hyuckroul Kwon, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 102 days.

(21) Appl. No.: 14/541,527

(22) Filed: Nov. 14, 2014

(65) Prior Publication Data

US 2016/0036073 A1 Feb. 4, 2016

(30) Foreign Application Priority Data

Aug. 1, 2014 (KR) .................. 10-2014-0099207

(51) Int. Cl.
*H01M 8/04* (2016.01)
(52) U.S. Cl.
CPC ........... *H01M 8/04291* (2013.01); *Y02E 60/50* (2013.01); *Y02E 60/521* (2013.01)
(58) Field of Classification Search
CPC .............................................. H01M 8/04291
See application file for complete search history.

(56) References Cited

U.S. PATENT DOCUMENTS

| 8,323,844 | B2 | 12/2012 | Tsuchiya et al. | |
|---|---|---|---|---|
| 2001/0015500 | A1* | 8/2001 | Shimanuki | B01F 3/04007 261/104 |
| 2007/0122669 | A1* | 5/2007 | Kusano | B60L 11/1881 429/414 |
| 2008/0217795 | A1* | 9/2008 | Gofer | H01M 8/04141 261/104 |
| 2009/0025293 | A1* | 1/2009 | Patton | C01B 3/065 48/199 FM |
| 2009/0121366 | A1* | 5/2009 | Leister | B01D 53/22 261/101 |

FOREIGN PATENT DOCUMENTS

| JP | 2001-202978 A | 7/2001 |
|---|---|---|
| KR | 10-2012-0124666 A | 11/2012 |

\* cited by examiner

*Primary Examiner* — Carlos Barcena
(74) *Attorney, Agent, or Firm* — Mintz Levin Cohn Ferris Glovsky and Popeo, P.C.; Peter F. Corless

(57) ABSTRACT

A humidifier for a fuel cell is provided. The humidifier is configured to humidify discharged gas from a cathode of the fuel cell and dry air supplied via an air compressor using membrane, and supply humidified air to the cathode. The humidifier includes: a membrane module having bundles of hollow fiber membranes disposed therein and manifolds each of which is connected to both sides of the membrane module, configured to inject the discharge gas and the dry air into an interior of the membrane module, and discharge the discharged gas from which moisture is removed and the humidified air from the interior of the membrane module. At least one bypass line is inserted into interiors of the manifolds and is connected to the interior of the membrane module, and is selectively connected to a supplying path of the dry air supplied from the air compressor.

14 Claims, 7 Drawing Sheets

(a)　　　　　　　　　　　(b)

HUMIDIFIER FOR FUEL CELL AND FUEL CELL SYSTEM COMPRISING THE SAME

CROSS-REFERENCE TO RELATED APPLICATION

This application claims priority to and the benefit of Korean Patent Application No. 10-2014-0099207 filed in the Korean Intellectual Property Office on Aug. 1, 2014, the entire contents of which are incorporated herein by reference.

TECHNICAL FIELD

The present invention relates to a fuel cell system of a fuel cell vehicle. In particular, a humidifier for humidifying reaction gas which is supplied to the fuel cell is provided.

BACKGROUND

In general, a fuel cell system is a power generation system which generates electric energy by an electrochemical reaction of hydrogen and oxygen or oxygen in air in a fuel cell. For example, the fuel cell system has been used in a fuel cell vehicle to operate an electric motor and drive the vehicle. The fuel cell system includes a stack, where unit fuel cells including a cathode and an anode generate electricity, an air supplying device supplies air to the cathode of the fuel cell, and a hydrogen supplying device supplies hydrogen to the anode of the fuel cell.

Meanwhile, in a polymer fuel cell, substantial amount of moisture is required for functioning of an ion-exchange membrane in a membrane-electrode assembly (MEA), and thus, the air supplying device of the fuel cell system includes a humidifier for humidifying air which is supplied to the fuel cell. The humidifier supplies moisture in air at an elevated temperature or moisture discharged from the cathode of the fuel cell to dry air which is supplied through an air compressor of the air supplying device, and then, supplies the humidified air to the cathode of the fuel cell.

Examples of the humidifier may include various types such as a bubbler type, an injection type, a plate type, an absorbent type, a membrane type, and the like. However, since the fuel cell vehicle has a limitation in a package space, the membrane-type humidifier having a reduced volume has been used in the fuel cell vehicle. In particular, the membrane-type humidifier may provide advantages in packing and particular power source may not be required for the membrane-type humidifier.

The membrane-type humidifier, which is, hereafter referred to "membrane humidifier", may use membrane for humidifying by exchanging moisture from a gas to gas such as between discharged gas at the elevated temperature and humidity from the cathode of the fuel cell and dry air supplied through the air compressor.

The humidified air generated by the membrane humidifier is supplied to the cathode of the fuel cell and the discharged gas from which moisture is removed in the membrane humidifier is supplied into the air. For example, the membrane humidifier includes a membrane module in which hollow fiber membranes are substantially disposed within a housing having a cylindrical shape and manifolds of shell type which are formed at both sides of the membrane module.

Meanwhile, according to the related art, a structure of the humidifier has been provided and a portion of the dry air which is supplied through the air compressor may be sprayed into a discharge path of the discharged gas to dilute hydrogen in the discharged gas from which moisture is removed from the humidifier into the air. Since the hydrogen is contained in the discharged gas into the air in the fuel cell vehicle, hydrogen in the discharged gas is required to be diluted as described above according to environmental and safety regulation for discharging gases.

Accordingly, in the related art, a bypass line which is branched from an air supplying line that connects the air compressor and the humidifier to and connected to a discharge line of the discharged gas of the humidifier has been provided, and an open and close valve for selectively opening or closing a channel of the bypass line has been provided. However, as a separate bypass line connecting the air supplying line and the discharge line of the discharged gas to each other is formed, a space for installing the bypass line may be required, and as such, efficient package may not be obtained.

Although the membrane humidifier may occupy less volume than other types of humidifiers, scheme for exchanging the gas with gas moisture may still require a substantial volume as a part in a vehicle. Particularly, the additionally used bypass line as described above may not be efficient.

Further, according to the related art, water condensate may be generated in the membrane humidifier as the membrane humidifier operates. Since such water condensate may be frozen in cold weather condition, an air channel in the humidifier may be reduced thereby causing increase the burden of the air compressor as the pressure rises, and a power consumption of the air compressor may increase, thereby deteriorating fuel efficiency of the fuel cell vehicle.

In addition, when the water condensate in the humidifier is frozen in cold weather condition, the membrane module of the humidifier may be damaged and humidifying performance of the humidifier may be deteriorated due to the volume of the water condensate increases by forming ice.

The above information disclosed in this Background section is merely for enhancement of understanding of the background of the invention and therefore it may contain information that does not form the prior art that is already known in this country to a person of ordinary skill in the art.

SUMMARY

The present invention provides a humidifier for a fuel cell and a fuel cell system. The humidifier may reduce a package of the fuel cell system and may provide substantially improved humidifying performance by applying a bypass line in the humidifier.

In an exemplary embodiment of the present invention, a humidifier for a fuel cell may humidify discharged gas from a cathode of the fuel cell and dry air supplied through an air compressor using membrane. The humidifier may also be configured to supply humidified air to the cathode. The humidifier may include: a membrane module having bundles of hollow fiber membranes disposed within the membrane module; manifolds each of which may be connected to both sides of the membrane module, and may be configured to inject the discharged gas and the dry air into an interior of the membrane module, and discharge the discharged gas from which moisture is removed and the humidified air from the interior of the membrane module; and at least one bypass line inserted into each interior of the manifolds and connected to the interior of the membrane module, and selectively connected to a supplying path of the dry air supplied from the air compressor.

The bypass line may be installed with a valve which is disposed on an exterior of the manifold. The membrane module may include a supporting member which may support both ends of the hollow fiber membrane. The bypass line may be fixed to the supporting member. The bypass line may be inserted into any one manifold discharging the discharged gas from which the moisture is removed and be extended to an interior of the other manifold. The bypass line may be exposed to the exterior of the membrane module between the manifolds. The bypass line may be disposed in a portion in which water condensate may be collected in the interiors of the membrane module and the manifolds. The bypass line may be inserted into a lower portion of at least one manifold discharging the discharged gas from which the moisture is removed and be connected to the interior of the manifold.

The bypass line may be disposed on an upper portion of at least one manifold discharging the discharged gas from which the moisture is removed and be connected to the interior of the manifold. The bypass line may include connecting apertures connected to the interior of at least one manifold discharging the discharged gas from which the moisture is removed. The bypass line may be installed with a check valve configured to prevent a backward flow of the dry air. The check valve may be formed by a duckbill valve.

In another exemplary embodiment, a fuel cell system may include: a stack having a plurality of unit fuel cells configured to generate electricity; an air compressor configured to supply air to a cathode of the fuel cell; a humidifier connected to the air compressor and configured to humidify discharged gas from the cathode and dry air supplied through the air compressor using membranes; and a hydrogen tank configured to supply hydrogen to an anode of the fuel cell. In particular, at least one bypass line may be selectively connected to an air supplying path between the air compressor and the humidifier and may be disposed in the humidifier.

The humidifier may include: a membrane module having bundles of hollow fiber membranes disposed within the membrane module; and manifolds each of which may be connected to both sides of the membrane module, configured to inject the discharged gas and the dry air into an interior of the membrane module and discharge the discharged gas from which moisture is removed and the humidified air from the interior of the membrane module. The bypass line may be inserted into the interiors of the manifolds and be connected to the interior of the membrane module, and be selectively connected to a supplying path of the dry air supplied from the air compressor. The bypass line may be installed with an open and close valve which may be disposed on an exterior of the manifold. The bypass line may be installed with a duckbill check valve.

According to various exemplary embodiments of the present invention, since the bypass line configured to supply air into the humidifier may be disposed in the humidifier to dilute hydrogen in the discharged gas from the humidifier, the channel in the humidifier may be utilized as the bypass line space. Therefore, additional space in which the pipe or hose for bypass line of the dry air may be installed may not be required, thereby reducing the package in the fuel cell system.

Further, according to various exemplary embodiments of the present invention, since the bypass line may be disposed in the portion in which the water condensate is collected in the membrane module and the membrane manifold, the water condensate or the collected water in the humidifier may be discharged to the exterior as the dry air supplied through the bypass line, to prevent elevation of pressure in the humidifier which occurs due to ice in cold weather condition.

Therefore, the burden of the air compressor due to the pressure elevation in the humidifier may be reduced, and as consequence, the power consumption of the air compressor may be reduced and fuel efficiency of the fuel cell vehicle may be improved. In addition, since the water in the humidifier may be used for humidifying the membrane by the air flow in the humidifier by the bypass line, efficiency of the humidifier may be further improved.

BRIEF DESCRIPTION OF THE DRAWINGS

The drawings are to reference in describing exemplary embodiment of the present invention, and the technical scope of the present invention is not interpreted to be limited to the accompanying drawings.

Figure 1:
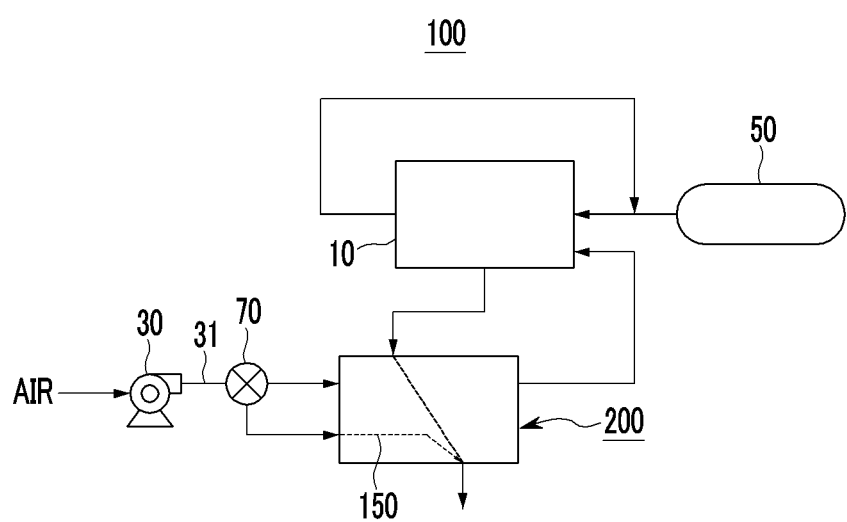
FIG. 1 schematically shows an exemplary fuel cell system according to an exemplary embodiment of the present invention.

Reference numerals set forth in the FIGS. 1-7 include reference to the following elements as further discussed below:

10 . . . stack
30 . . . air compressor
31 . . . air supplying line
50 . . . hydrogen tank
70 . . . open and close valve
110 . . . membrane module
111 . . . hollow fiber membrane
113 . . . housing
115 . . . supporting member
120 . . . first manifold
121 . . . first inlet
123 . . . first outlet
130 . . . second manifold
131 . . . second inlet
133 . . . second outlet
150 . . . bypass line
151 . . . connecting hole
155 . . . check valve
157 . . . inlet end
158 . . . valve passage
159 . . . outlet end
100 . . . fuel cell system
200 . . . humidifier

DETAILED DESCRIPTION

In the following detailed description, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, since sizes and thicknesses of the respective components shown in the drawings are arbitrarily shown for the convenience of explanation, the present invention is not necessarily limited to those shown in the drawings and thicknesses of several layers and regions are exaggerated for clarity. In addition, in the following detailed description, classifying names of the configurations into first, second, and the like, is to classify the configurations because the configurations have the same relationship, and the present invention is not necessarily limited to the above-mentioned order in the following detailed description.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

In addition, a term "unit", "means", "part", "member", or the like, described in the specification means a unit having a generic configuration of performing at least one function or operation.

FIG. 1 shows an exemplary fuel cell system according to an exemplary embodiment of the present invention. In FIG. 1, a fuel cell system 100 generates electric energy by an electrochemical reaction of hydrogen as a fuel and air as an oxidizing agent and the fuel cell system may be used in a fuel cell vehicle, but the examples are not limited thereto.

The fuel cell system 100 according to an exemplary embodiment of the present invention may include: a stack 10, an air compressor 30, a humidifier 200, and a hydrogen tank 50. The stack 10 may include unit fuel cells each having a cathode and an anode configured to generate electricity and separators which may be referred to as "a separate plate" or "bipolar plate" in the related arts. The separators may be disposed at both side of each unit fuel cell and a membrane-electrode assembly is disposed between the separators.

The cathode of the fuel cell may be configured to discharge wet air of elevated temperature and humidity, which is referred to as "discharged gas" throughout the disclosure. The anode of the fuel cell may be configured to discharge wet hydrogen of elevated temperature and humidity as unreacted hydrogen. The air compressor 30 may be configured to supply air to the cathode of the fuel cell and suction the air from the atmosphere, which is referred to as "dry air" herein after. The dry air may be compressed and supplied to the humidifier 200 by the air compressor.

The humidifier 200 according to an exemplary embodiment of the present invention may be configured to humidify using membrane by exchanging moistures between gas and gas, such as between the discharged gas from the cathode of the fuel cell and the dry air supplied from the air compressor 30. The humidifier 20 may also be configured to supply the humidified air to the cathode of the fuel cell. In particular, the humidifier 200 may be connected to the air compressor 30 via an air supplying line 31.

An exemplary configuration of the humidifier 200 for the fuel cell will be described below in detail with reference to FIGS. 2 and 3. The hydrogen tank may be configured to store the hydrogen gas and supply the hydrogen gas to the anode. The stack 10, the air compressor 30, and the hydrogen tank 50 generally described in the art may be used without limitation in the present invention.

The fuel cell system 100 according to an exemplary embodiment of the present invention as described above may be configured to supply a portion of the dry air provided from the air compressor 30 to the humidifier 200 to dilute hydrogen in the discharged gas from the humidifier 200. Particularly, a path through which the portion of the dry air is supplied to the humidifier 200 may be disposed in the humidifier 200, such that a package in the fuel cell system may be reduced and the humidifier 200 for the fuel cell may improve humidifying efficiency.

Hereinafter, the humidifier 200 applied in the fuel cell system 100 according to exemplary embodiments of the present invention will be described in detail with reference to the accompanying drawings.

Figure 2:
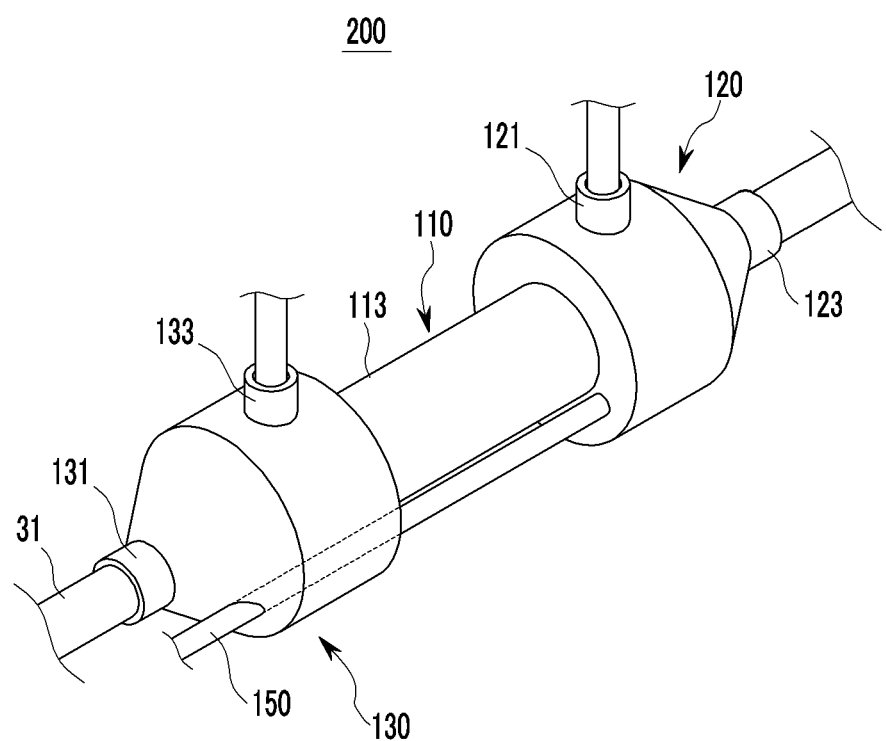
FIG. 2 schematically shows an exemplary humidifier for an exemplary fuel cell according to an exemplary embodiment of the present invention.
Figure 3:
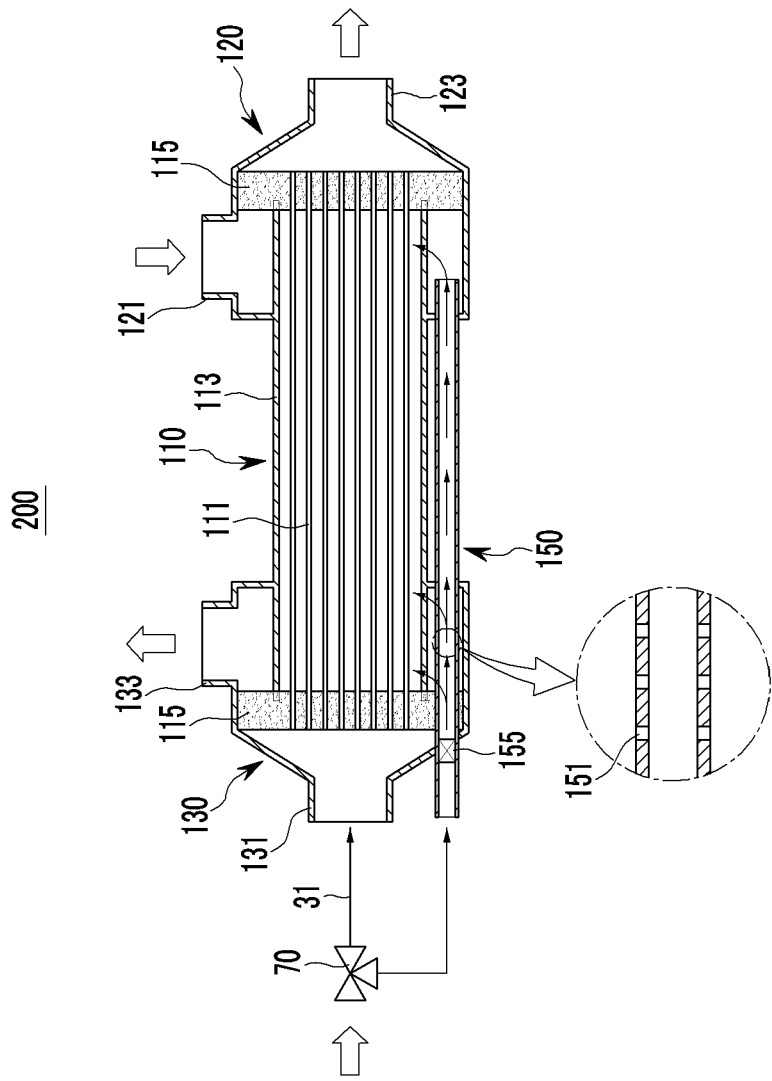
FIG. 3 shows a cross-sectional configuration view of an exemplary humidifier for the fuel cell according to an exemplary embodiment of the present invention.
Figure 4:
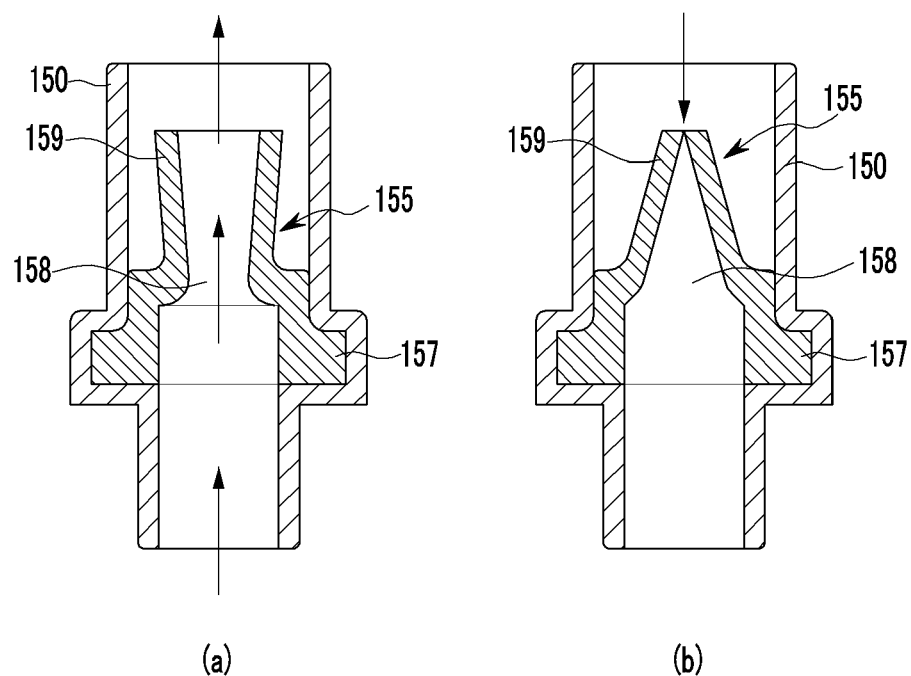
FIG. 4 schematically shows an exemplary check valve of an exemplary bypass line which may be used for an exemplary humidifier for an exemplary fuel cell according to an exemplary embodiment of the present invention.

FIG. 2 schematically shows an exemplary humidifier for a fuel cell according to an exemplary embodiment of the present invention and FIG. 3 is a cross-sectional configuration view schematically showing an exemplary humidifier for an exemplary fuel cell according to an exemplary embodiment of the present invention.

In FIGS. 1 to 3, the humidifier 200 for the fuel cell may include: a membrane module 110; first and second manifolds 120 and 130; and a bypass line 150. The membrane module 110 may have bundles of hollow fiber membranes 111 disposed therein. The membrane module 110 may have the bundle of hollow fiber membrane 111 embedded within a housing 113 having a cylindrical shape, but the exemplary shape of the housing may not be limited thereto.

In addition, the membrane module 110 may include a supporting member 115 configured to support both ends of the hollow fiber membrane 111. The supporting member 115 may be formed of a polymeric material and may support the both end portions of the bundle of the hollow fiber membrane 111 to be fixed at both ends of the housing 113. The manifolds 120 and 130 may be formed in a shell shape and may be connected to both ends of the membrane module 110. The manifolds 120 and 130 may be configured to inject the discharged gas from the stack 10 and the dry air supplied through the air compressor 30 into the membrane module 110. In addition, the manifolds 120 and 130 may be configured to discharge the humidified air from the membrane humidification. In particular, in an interior of the membrane module 110, moisture may be exchanged between the discharged gas and the dry air, or between the discharged gas and the discharged gas from which the moisture is removed.

The manifold connected to a first side end portion of the membrane module 110 may be referred to as a first manifold 120, and the manifold connected to a second side end portion of the membrane module 110 may be referred to as a second manifold 130. The first manifold 120 may form a first inlet 121 for introducing or injecting the discharged gas from the stack 10 into the membrane module 110, and a first outlet 123 discharging the humidified air. In addition, the second manifold 130 may form a second inlet 131 for introducing or injecting the dry air supplied through the air compressor 30 into the membrane module 110, and a second outlet 133 for discharging the gas from which the moisture is removed into the atmosphere.

The first outlet 123 of the first manifold 120 may be connected to the stack 10 via a supplying line configured to supply the humidified air and the second inlet 131 of the second manifold 130 may be connected to the air compressor 30 via the air supplying line 31. The bypass line 150 may be configured to supply a portion of the dry air provided from the air compressor 30 to the membrane module 110 via the first and second manifolds 120 and 130, thereby diluting hydrogen in the discharged gas which is discharged into the atmosphere through the second outlet 133 of the second manifold 130.

The bypass line 150 may be selectively connected to the air supplying line 31 as mentioned above, and may be disposed within the humidifier 200. In particular, the bypass line 150 may be configured to supply the portion of the dry air provided from the air compressor 30 into the membrane module 110 via interiors of the first and second manifolds 120 and 130. For example, the bypass line 150 may be branched from the air supplying line 31, be inserted into the first and second manifolds 120 and 130, and be connected to the interior of the membrane module 110.

In addition, the bypass line 150 may be selectively connected to the air supplying line 31, may be inserted into the second manifold 130, and may be extended to the first manifold 120. Particularly, the bypass line 150 may be inserted into and penetrate via the second manifold 130, may be extended along a length direction of the membrane module 110, and may be inserted into the first manifold 120. Moreover, the bypass line 150 may be fixed to the supporting member 150 in the first manifold 120 and may be exposed to the exterior of the membrane module 110 between the first and second manifolds 120 and 130. In particular, an open and close valve 70 for selectively opening or closing the bypass line 150 may be installed at a connected point of the air supplying line 31 and the bypass line 150. Accordingly, the open and close valve 70 may be installed on the bypass line 150 which may be an exterior of the second manifold 130. The open and close valve 70 may be provided as a three-way valve which may be configured to selectively connect the air supplying line 31 and the bypass line 150 according to an electrical signal.

Meanwhile, connecting apertures 151 connected to the interior of the second manifold 130 may be formed in the bypass line 150. Particularly, the bypass line 150 may be connected to the interior of the membrane module 110 via the connecting apertures 151 in the interior of the second manifold 130. In addition, a check valve 155 configured to prevent backward flow of the dry air supplied from the air compressor 30 may be installed in an air flowing path of the bypass line 150. The check valve 155 may be provided as a duckbill check valve, but the examples may not be limited thereto. The duckbill check valve may include an inlet end 157 into which fluid may be introduced and an outlet end 159 having a duck-billed shape from which the fluid may be discharged. For example, the duckbill check valve may have an elastically deformed outlet end 159 having a bill shape and an opened valve passage 158 by fluid pressure, based on a direction (e.g., fluid supplying direction) in which the fluid flows, as shown in FIG. 4A. In addition, as shown in FIG. 4B, when the fluid flows backward in an opposite direction, the duckbill check valve may include the outlet end 159 having the bill shape which may be restored to an original shape and a closed valve passage 158.

In another aspect, an operation of the fuel cell system 100 including an exemplary humidifier 200 for an exemplary fuel cell according to an exemplary embodiment of the present invention will be described in detail with reference to the above described drawings. In an exemplary embodiment of the present invention, when electrical energy is generated by the electrochemical reaction of hydrogen and air in the fuel cells of the stack 10, the cathodes of the fuel cells may discharge the discharged gas of elevated temperature and humidity. Subsequently, the discharged gas from the cathode may be supplied to the membrane module 110 via the first inlet 121 of the first manifold 120. During the above-mentioned process, the dry gas supplied via the air compressor 30 may be supplied to the membrane module 110 via the second inlet 131 of the second manifold 130. In particular, the dry air provided from the air compressor 30 may be supplied to the second inlet 131 via the air supplying line 31. In addition, the open valve may be configured to open the air supplying line 31 and the close valve may be configured to close the bypass line 150, but the open valve and the close valve may be integrally formed as one valve.

Accordingly, the membrane module 110 may be configured to perform membrane humidification by exchanging moisture between the discharged gas and the dry air. The humidified air may be discharged via the first outlet 123 of the first manifold 120 and may be supplied to the cathodes of the fuel cells. In addition, the discharged gas from which the moisture is removed in the interior of the membrane module 110 may be discharged to the atmosphere via the second outlet 133 of the second manifold 130.

Meanwhile, during the humidification by the humidifier of the present invention, hydrogen in the gas discharged to the atmosphere via the second outlet 133 of the second manifold 130 may be required to be diluted. In addition, the bypass line 150 may be opened by the open and close valve 70. Subsequently, the portion of the dry air provided from the air compressor 30 may be supplied to the interiors of the first and second manifolds 120 and 130 via the bypass line 150, and may be supplied to the interior of the membrane module 110 through the above-mentioned manifolds 120 and 130.

In particular, since the dry air may pass via the interior of the second manifold 130 through the bypass line 150 and may be supplied to the interior of the first manifold 120, the dry air may be supplied to the interior of the second manifold 130 via the connecting apertures 151 of the bypass line 150 in the interior of the second manifold 130. Consequently, the dry air may be supplied to the interior of the membrane module 110 via the first and second manifolds 120 and 130. In addition, when the dry air is supplied to the interiors of the first and second manifolds 120 and 130 via the bypass line 150, the backward flow of the dry air may be prevented by the check valve 155. The check valve 155 may have an elastically deformed outlet end having a bill shape and an opened valve passage by pressure of the dry air, based on a direction in which the dry air flows, as shown in FIG. 4A.

In addition, as shown in FIG. 4B, when the dry air flows backward in an opposite direction of the flowing, the check valve 155 may have the outlet end having the bill shape which may be restored to an original shape and a closed valve passage thereby preventing the backward flow of the dry air. In the fuel cell system 100 according to various exemplary embodiments of the present invention as described above, the bypass line 150 supplying the dry air to the humidifier 200 may be disposed in the humidifier 200 to dilute the hydrogen in the discharged gas from the humidifier 200.

Accordingly, since the bypass line 150 supplying air into the humidifier 200 may be disposed in the humidifier 200 to dilute the hydrogen in the discharged air from the humidifier 200, the channel in the humidifier 200 may be utilized as a bypass line space, to omit a space of a pipe or hose for bypass of the dry air to be installed, thereby reducing the package in the fuel cell.

Figure 5:
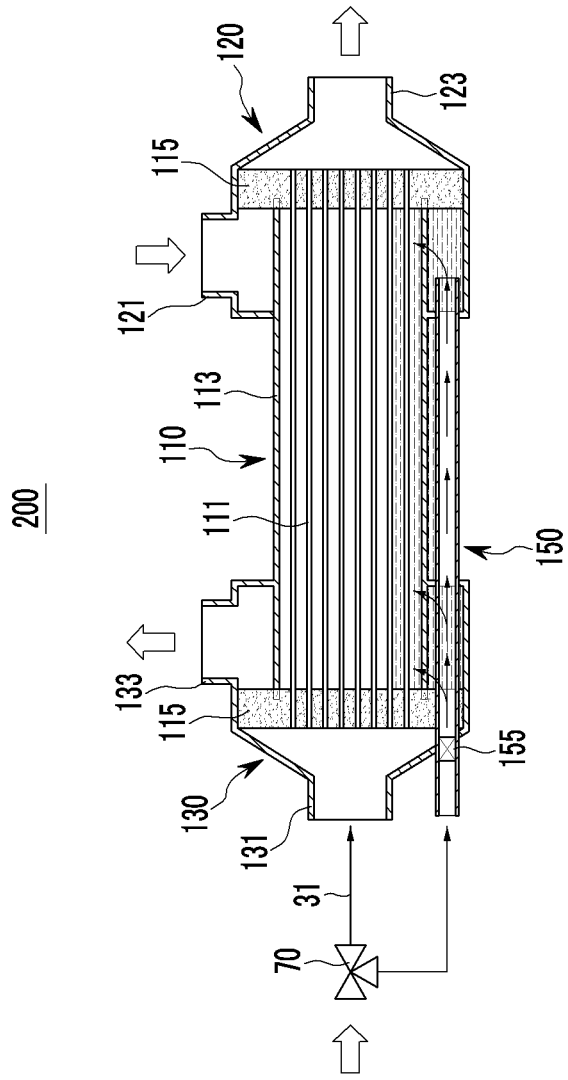
FIGS. 5 to 7 schematically show modified examples of exemplary bypass lines which may be used for exemplary humidifiers for exemplary fuel cells according to various exemplary embodiments of the present invention.
Figure 6:
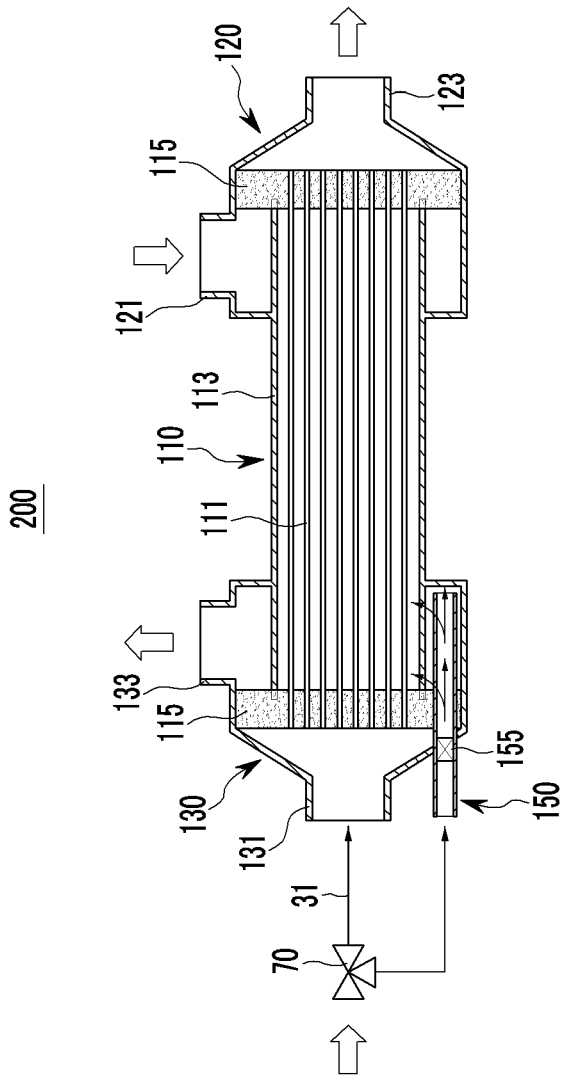
Figure 7:
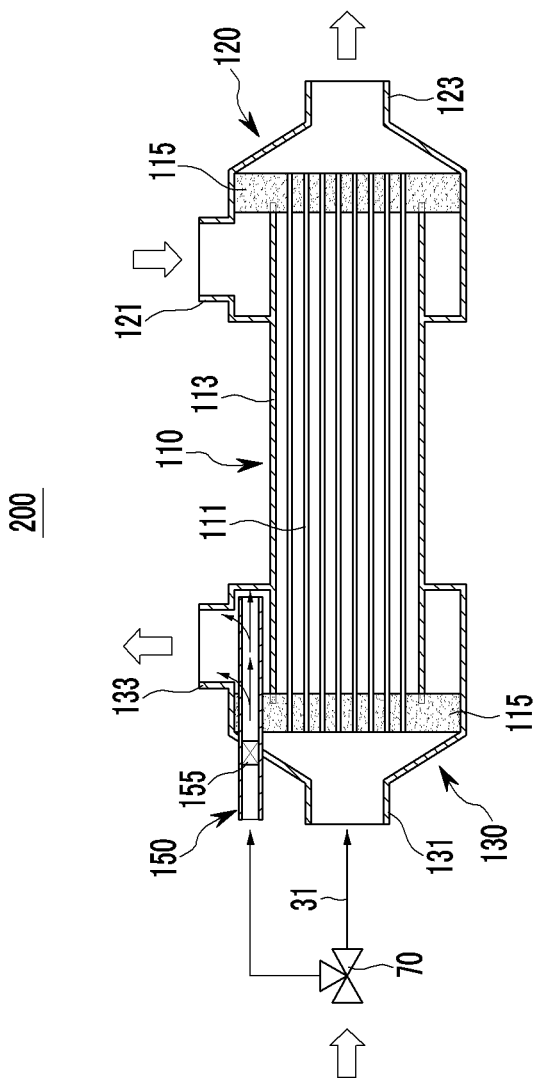

FIGS. 5 to 7 schematically show various examples of the bypass line used for the humidifier for the fuel cell according to various exemplary embodiments of the present invention. As shown in FIG. 5, an exemplary bypass line 150 may be disposed in a portion in which water condensate is collected in the membrane module 110 and the manifolds 120 and 130. Since the condensed water or collected water in the humidifier 200 may be discharged to the exterior as the dry air supplied via the bypass line 150, elevation of pressure in the humidifier 200 due to ice generated in cold weather condition may be prevented. Moreover, the burden of the air compressor 30 due to the pressure elevation in the humidifier 200 may be reduced, and as consequence, power consumption of the air compressor 30 may be reduced and fuel efficiency of the fuel cell vehicle may be improved.

In addition, since the condensed water or collected water in the humidifier 200 may be discharged to the exterior as the dry air supplied via the bypass line 150, the water in the humidifier 200 may be used to humidify air flow using membrane in the humidifier 200, such that efficiency of the humidifier 200 may be further improved.

As shown in FIG. 6, an exemplary bypass line 150 may be inserted into a lower portion of the second manifold 130 and connected to the interior of the second manifold 130. In particular, the bypass line 150 may be connected to the interior of the second manifold 130 as inserted into the lower portion of the second manifold 130 while not penetrating through the lower portion of the second manifold 130.

As shown in FIG. 7, an exemplary bypass line 150 may be inserted into an upper portion of the second manifold 130 and connected to the interior of the second manifold 130. In particular, the bypass line 150 may be connected to the interior of the second manifold 130 as inserted into the upper portion of the second manifold 130 but not penetrating through the upper portion of the second manifold 130.

Although the exemplary embodiments of the present invention have been described, it should be noted that the spirit of the present invention is not limited to the exemplary embodiments set forth herein and those skilled in the art and understanding the present invention can easily accomplish other exemplary embodiments included in the spirit of the present invention by the addition, modification, and removal of components within the same spirit, but those are construed as being included in the spirit of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A humidifier for a fuel cell, comprising:
   a membrane module having bundles of hollow fiber membranes disposed in the membrane module;
   a first inlet injecting discharged gas from a cathode of the fuel cell;
   a first outlet discharging humidified air from an interior of the membrane module;
   a second inlet injecting dry air supplied via an air compressor into the interior of the membrane module;
   a second outlet discharging the discharged gas from which moisture is removed; and
   a bypass line inserted into an interior of a manifold in which the second inlet is formed, and supplying a portion of the dry air supplied from the air compressor to the membrane module,
   wherein an open and close valve selectively connecting the bypass line to the air supplying line is installed at a connected point of the bypass line and an air supplying line connecting the air compressor to the manifold, and
   wherein the humidifier is configured to exchange moisture between the discharged gas from the cathode of the fuel cell and the dry air supplied via the air compressor and supply the humidified air to the cathode.

2. The humidifier of claim 1, wherein the bypass line is installed with open and close valve disposed on an exterior of the manifold.

3. The humidifier of claim 1, wherein the membrane module includes a supporting member configured to support both ends of the hollow fiber membrane, and the bypass line is fixed to the supporting member.

4. The humidifier of claim 1, wherein the bypass line is extended to an interior of the other manifold in which the first outlet is formed.

5. The humidifier of claim 4, wherein the bypass line is exposed to the exterior of the membrane module between the manifolds.

6. The humidifier of claim 4, wherein the bypass line is disposed in a portion in which water condensate is collected in the interiors of the membrane module and the manifolds.

7. The humidifier of claim 1, wherein the bypass line is inserted into a lower portion of the manifold configured to discharge the discharged gas from which the moisture is removed, and is connected to the interior of the manifold.

8. The humidifier of claim 1, wherein the bypass line is disposed on an upper portion of the manifold configured to discharge the discharged gas from which the moisture is removed, and is connected to the interior of the manifold.

9. The humidifier of claim 1, wherein the bypass line is provided with connecting apertures connected to the interior of the manifold configured to discharge the discharged gas from which the moisture is removed.

10. The humidifier of claim 1, wherein the bypass line is installed with a check valve for preventing a backward flow of the dry air.

11. The humidifier of claim 10, wherein the check valve is formed by a duckbill valve.

12. A fuel cell system, comprising:
    a stack including unit fuel cells configured to generate electricity;
    an air compressor configured to supply air to a cathode of the fuel cell;

a humidifier connected to the air compressor and configured to perform membrane humidification of discharged gas discharged from the cathode and dry air supplied via the air compressor; and a hydrogen tank configured to supply hydrogen to an anode of the fuel cell, wherein the humidifier includes:

a membrane module having bundles of hollow fiber membranes disposed in the membrane module;

a first inlet injecting the discharged gas from the cathode;

a first outlet discharging humidified air from an interior of the membrane module;

a second inlet injecting the dry air supplied via the air compressor into the interior of the membrane module;

a second outlet discharging the discharged gas from which moisture is removed; and a bypass line inserted into an interior of a manifold in which the second inlet is formed, and supplying a portion of the dry air supplied from the air compressor to the membrane module, and wherein an open and close valve selectively connecting the bypass line to the air supplying line is installed at a connected point of the bypass line and an air supplying line connecting the air compressor to the manifold.

13. The fuel cell system of claim 12, wherein the bypass line is installed with the open and close valve which is disposed on an exterior of the manifold.

14. The fuel cell system of claim 12, wherein the bypass line is installed with a duckbill check valve.

* * * * *